(12) United States Patent
Levin-Michael et al.

(10) Patent No.: US 6,664,964 B1
(45) Date of Patent: Dec. 16, 2003

(54) CORRELATION CRITERIA FOR LOGICAL VOLUMES

(75) Inventors: Orit Levin-Michael, Newton, MA (US); Adnan Sahin, Brookline, MA (US)

(73) Assignee: EMC Corporation, Hopkinton, MA (US)

(*) Notice: Subject to any disclaimer, the term of this patent is extended or adjusted under 35 U.S.C. 154(b) by 497 days.

(21) Appl. No.: 09/709,077

(22) Filed: Nov. 10, 2000

(51) Int. Cl.$^7$ .............................................. G06T 11/20
(52) U.S. Cl. ..................... 345/440; 345/440.1
(58) Field of Search ................. 345/440–443, 345/619, 636, 637–640, 35–39, 440.1, 440.2, 441, 442, 153, 154; 382/160, 203–208, 168–172, 113; 717/132–133, 144, 156, 157; 283/115

(56) References Cited

U.S. PATENT DOCUMENTS

| | | | |
|---|---|---|---|
| 6,320,586 B1 * | 11/2001 | Plattner et al. | 345/700 |
| 6,369,820 B1 * | 4/2002 | Bertram et al. | 345/440 |
| 6,385,268 B1 * | 5/2002 | Fleming et al. | 375/377 |
| 6,414,691 B1 * | 7/2002 | Nakagawa et al. | 345/619 |
| 6,429,868 B1 * | 8/2002 | Dehner, Jr. et al. | 345/440 |
| 6,542,156 B1 * | 4/2003 | Hong et al. | 345/440 |

* cited by examiner

*Primary Examiner*—Michael Bazavi
*Assistant Examiner*—Thu-Thao Havan
(74) *Attorney, Agent, or Firm*—John M. Gunther; Penelope S. Wilson (57) ABSTRACT

A system and method for determining whether activity graphs (hereinafter "graphs") for logical volumes of data storage are correlated. A number of correlation criteria are applied to the graphs, including the area ratio criteria determines whether an area ratio described by the graph is at least as great as a predetermined value; the peak ratio criteria indicates that one graph is correlated to another graph if a peak ratio described by the two graphs is as large as a predetermined peak ratio value; and the sharp peak criteria indicates in the event that one graph is correlated to another graphs having at least one coincidental peak. Different combinations of all or some of the disclosed correlation criteria and the traditional correlation coefficient may be used to determine whether graphs of logical volumes are correlated, the level of correlation, and how "strong" of a correlation exists between the graphs.

40 Claims, 6 Drawing Sheets

CORRELATION CRITERIA FOR LOGICAL VOLUMES

CROSS REFERENCE TO RELATED APPLICATIONS

N/A

STATEMENT REGARDING FEDERALLY SPONSORED RESEARCH OR DEVELOPMENT

N/A

BACKGROUND OF THE INVENTION

The present invention relates generally to computer systems, and more particularly to efficient management of data storage systems and computer system performance. The present invention relates specifically to a system and method for determining whether the activity graphs of logical volumes are correlated.

Data storage for computer systems may be provided using a variety of device types and technologies. Mass storage of computer readable data is often provided using electromagnetic storage disks, sometimes referred to as "hard disks", or "disks".

A device which controls and/or operates one or more disks is sometimes referred to as a "disk adapter." A disk adapter typically controls a set of stacked storage disks, each of which has data recorded electromagnetically in "blocks" of data which are organized onto concentric circles or "tracks." A disk "head" writes or reads the data stored on the tracks.

It is often desirable to have some form of virtual disk subsystem in order to provide flexibility in the allocation and management of disk storage. A virtual disk subsystem may be used to define what are referred to as "logical volumes", using storage capacity from one or more disks. For example, one or more disks may be organized into a group to form a storage pool from which disk space may be allocated to form the logical volumes. Each logical volume may consist of an arbitrary-size storage space defined within the related group of storage devices. Each logical volume can then be used as a separate storage space for a file system or for raw data storage by various applications.

A problem arises with respect to mapping logical volumes onto specific physical devices, due to the fact that system performance may suffer when two or more logical volumes with correlated activity graphs are co-located on one or more physical devices. In such circumstances, shared resources of the physical device or devices storing the correlated logical volumes may impose a bottleneck on system performance during periods of coincidental high activity.

Thus, it would be desirable to have a system which determines whether the activity graphs of two logical volumes are correlated, so that appropriate action may be taken to prevent system performance degradation.

A known mathematical technique for determining the correlation of two data sequences is the "correlation coefficient" method. The correlation coefficient technique is a mathematical tool that may be employed to find linear relationships between two variables, X and Y. Correlation coefficient analysis typically results in a value from –1 to +1 describing the correlation of two data sequences over the length of interest. Therefore, correlation coefficient values close to 1 indicate a positive linear association between the variables, in that as one of the variables increases, so does the other. Conversely, correlation coefficient values close to –1 indicate a negative linear association between the variables, in that as one of the variables increases, the other decreases. Correlation coefficient values close to zero indicate a lack of linear association between the variables. As it is generally known, the correlation coefficient equation may be given as follows:

$$\text{CORRELATION COEFFICIENT} = \frac{\sum_i (X_i - \overline{X})(Y_i - \overline{Y})}{\sqrt{\sum_i (X_i - \overline{X})^2 \sum_i (Y_i - \overline{Y})^2}}$$

where $X_i$ and $Y_i$ in this case are activity levels at the $i^{th}$ time samples, and $\overline{X}$ and $\overline{Y}$ are the means of X and Y, respectively.

The correlation coefficient technique has certain drawbacks applied to the problem of determining whether the activity graphs of logical volumes are correlated. These drawbacks stem from the fact that the correlation coefficient approach assumes that a linear correlation exists between the two sequences being compared, which is frequently not true for activity graphs of logical volumes. Moreover, the correlation coefficient approach does not consider the correlation of the absolute activity levels of the logical volumes being compared.

For the reasons stated above, it would be desirable to have a system which determines whether the activity graphs of two logical volumes are correlated, at least in part based on their absolute activity levels, so as to detect whether the logical volumes have significant periods of coincidental high activity levels. Further, it would be desirable to have a system which determines whether the activity graphs are correlated for two logical volumes, at least partly based on the magnitude of changes in the respective activity levels, so as to detect whether the logical volumes have coincidental activity level increases of a large magnitude.

BRIEF SUMMARY OF THE INVENTION

In accordance with principles of the invention, a system and method are disclosed for determining whether activity graphs for logical volumes of data storage are correlated. Activity graphs are first generated over a test period for each of the logical volumes to be compared. Each activity graph consists of a series of activity levels measured at sampling points within the test period. An activity level for a logical volume may, for example, reflect the number of read and/or write operations involving data stored within that logical volume.

In an illustrative embodiment of the disclosed system, an area ratio criteria is employed to determine whether logical volume activity graphs are correlated. The disclosed system employs the area ratio criteria to determine whether activity graphs for a selected pair of logical volumes are correlated by determining whether an area ratio of the activity graphs is at least as great as a predetermined threshold. The area ratio of the activity graphs is a ratio between a minimum area and a maximum area described by the two activity graphs. The minimum area is defined as the area lying below both the activity graphs. The maximum area is defined as the area lying below either one or the other of the activity graphs. The predetermined threshold area ratio may, for example, be determined empirically for a given application, such that pairs of activity graphs which have an area ratio at least as large as the threshold area ratio value should be considered correlated.

In another illustrative embodiment, other correlation criteria are employed to determine if the activity graphs of two logical volumes are correlated. The set of correlation criteria which may be employed further includes a peak ratio criteria. The peak ratio criteria indicates that one activity graph is correlated to another activity graph if a peak ratio described by the two activity graphs is at least as large as a predetermined peak ratio value. The peak ratio for the two activity graphs being compared is a ratio between the number of coincidental peaks in the two graphs, and the difference between the total number of peaks in the two graphs and the number of coincidental peaks. The number of coincidental peaks may, for example, be defined as the number of peaks in one of the activity graphs which occur at the same time as peaks in the other activity graph. Further for purposes of illustration, a peak within an activity graph may be defined as an activity level sample which is above the average activity level for the activity graph, plus a predetermined offset value. Alternatively, or in addition, a peak within an activity graph may be defined as an activity level at least as large as the product of the average activity level for the activity graph multiplied by a predetermined multiplier value. Appropriate predetermined offset and/or multiplier values may be determined empirically for specific applications.

The correlation criteria employed by the disclosed system may further include a sharp peak criteria. The sharp peak criteria indicates that one activity graph is correlated to another in the event that the two activity graphs have a coincidental sharp peak. A coincidental sharp peak may only occur in the event that the highest activity levels of both logical volumes, during the relevant test period, occur at the same time. Additionally, a coincidental sharp peak may only occur in the event that these highest activity levels are also at least as great as the product of a next highest activity level within each respective activity graph and a predetermined multiplier. Furthermore, a coincidental sharp peak may only occur in the event that a value of a correlation coefficient for the two activity graphs is greater than a predetermined threshold correlation coefficient value.

A set of correlation criteria employed by the disclosed system may further include a correlation coefficient criteria. Such a correlation coefficient criteria employs the standard correlation coefficient technique to determine a correlation coefficient for the two graphs.

In the event that the disclosed system determines that two activity graphs are correlated by some correlation criteria, an indication of that determination may be generated, so that corrective action may be performed. Such indication may take the form of a message sent to, or posted for, a resource/configuration manager or entity, which may then take any form of corrective action that may be appropriate.

In this way, the disclosed system may advantageously determine whether the activity graphs of logical volumes are correlated, at least in part based on absolute activity levels. The disclosed system may further detect whether the logical volumes have significant periods of coincidental high activity levels. Additionally, the disclosed system further may determine whether the activity graphs of two logical volumes are correlated partly based on the magnitude of change in their respective activity levels over time, so as to detect whether the logical volumes have simultaneous high activity levels.

Different combinations of all or some of the disclosed correlation criteria may be used to determine whether activity graphs of logical volumes are correlated. Such combinations of the disclosed correlation criteria may further be used to determine the level of correlation between activity graphs of logical volumes. In this way, some or all of the disclosed correlation criteria may be used to determine how "strong" a correlation exists between the activity graphs of logical volumes.

BRIEF DESCRIPTION OF THE SEVERAL VIEWS OF THE DRAWING

The invention will be more fully understood by reference to the following detailed description of the invention in conjunction with the drawings, of which.

DETAILED DESCRIPTION OF THE INVENTION

Figure 1:
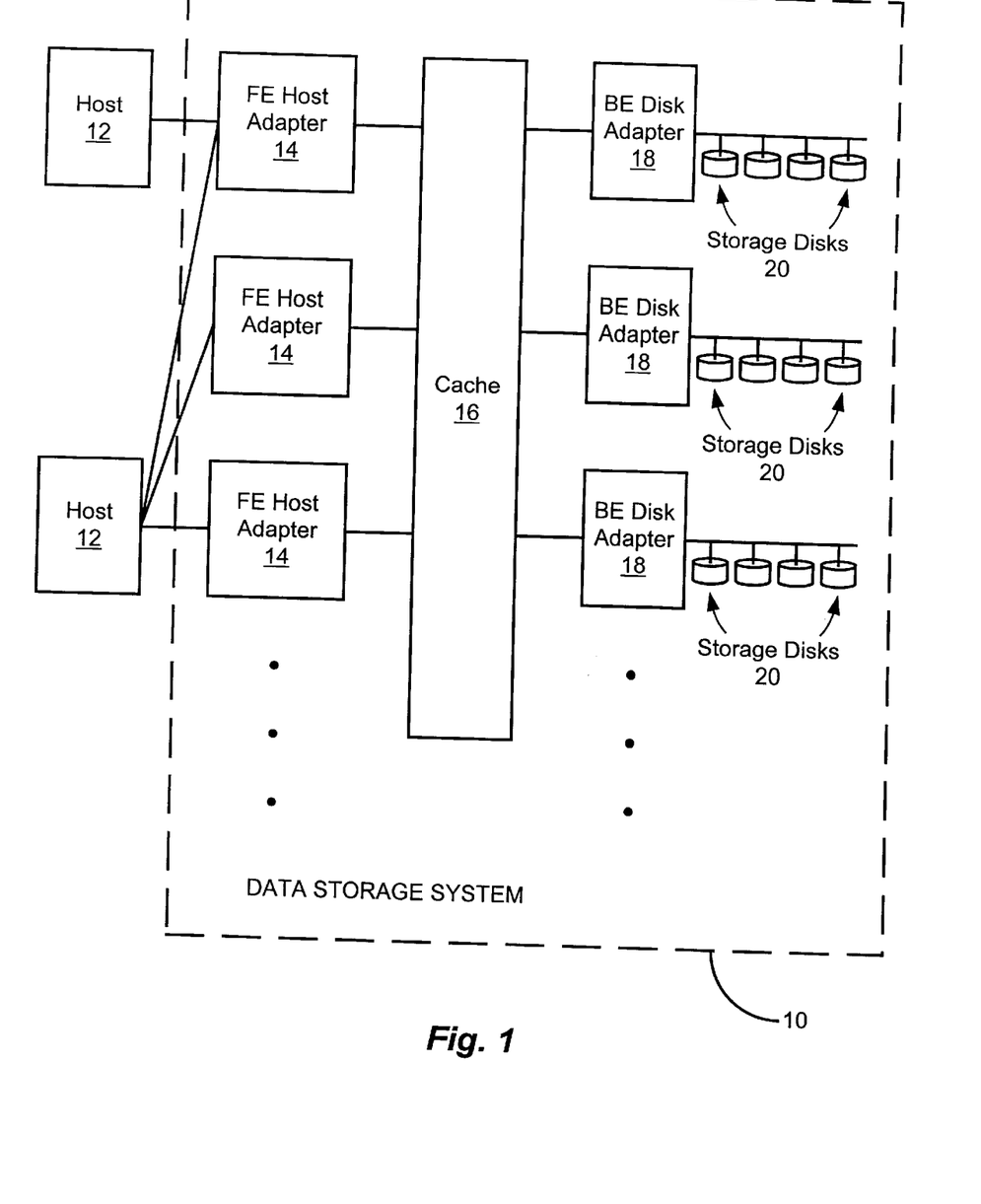
FIG. 1 shows an illustrative data storage system.

As shown in FIG. 1, an illustrative embodiment of the disclosed system is provided within a data storage system 10. The data storage system 10 provides data storage for host computer systems 12 through a number of front end (FE) host adapters 14. The front end adapters 14 are communicatively connected to a respective number of back end (BE) disk adapters, which each control associated groups of storage disks 20. The storage disks 20 may include various specific disk types and/or technologies, for example, electromagnetic disks conventionally referred to as "hard disks".

Each of the front end adapters 14 and back end adapters 18 may, for example, provide data storage and retrieval related functionality using a combination of hardware and/or software components. In an illustrative embodiment, one or more of the front end adapters 14 and/or back end adapters 18 include microprocessor based subsystems operable to execute software programs which embody some or all of the features of the disclosed system. Alternatively, some or all of the disclosed system may be embodied using a combination of hardware and/or software components, including, but not limited to, application specific integrated circuits (ASICS), various forms of microcode, and/or other technologies appropriate for a specific application. Moreover, while the embodiment of FIG. 1 shows the front end adapters 14 interconnected with the back end adapters 18 via the cache 16, those skilled in the art will recognize that alternative embodiments may use other interconnection mechanisms, such as communication busses and/or various other types of data communication technology. The data storage system 10 of FIG. 1 provides a virtual disk subsystem used to define a number of logical volumes representing storage capacity from one or more of the storage disks 20.

The disclosed system generates activity graphs over a test period for each of the logical volumes to be compared. As shown in FIGS. 2–5, each activity graph consists of a series of activity levels measured at sampling points within a test period. FIGS. 2–5 are not drawn to scale.

The activity levels shown in the activity graphs in FIGS. 2–5 reflect illustrative read and/or write transactions occurring with respect to the associated logical volumes. In an illustrative embodiment, the activity level values for the activity graphs shown in FIGS. 2–5 are generated in terms of the following units:

Logical Volume Activity Unit=$a+b+c$ where
- $a=1*$ the number of read requests performed during the sample period,
- $b=0.5*$ the number of write requests performed during the sample period, and
- $c=0.25*$ the number of prefetch requests performed during the sample period.

In an illustrative embodiment, an area ratio criteria is employed to determine whether the activity graphs of two logical volumes are correlated. In such an embodiment, the disclosed system determines whether an area ratio of the activity graphs is at least as great as a predetermined threshold. The area ratio of the activity graphs is a ratio between a minimum area and a maximum area described by the two activity graphs. The area ratio criteria, which ranges between 0 and 1, may therefore be described by the following equation:

$$\text{AREA RATIO} = \frac{\sum_i \min(X_i, Y_i)}{\sum_i \max(X_i, Y_i)}$$

Figure 2:
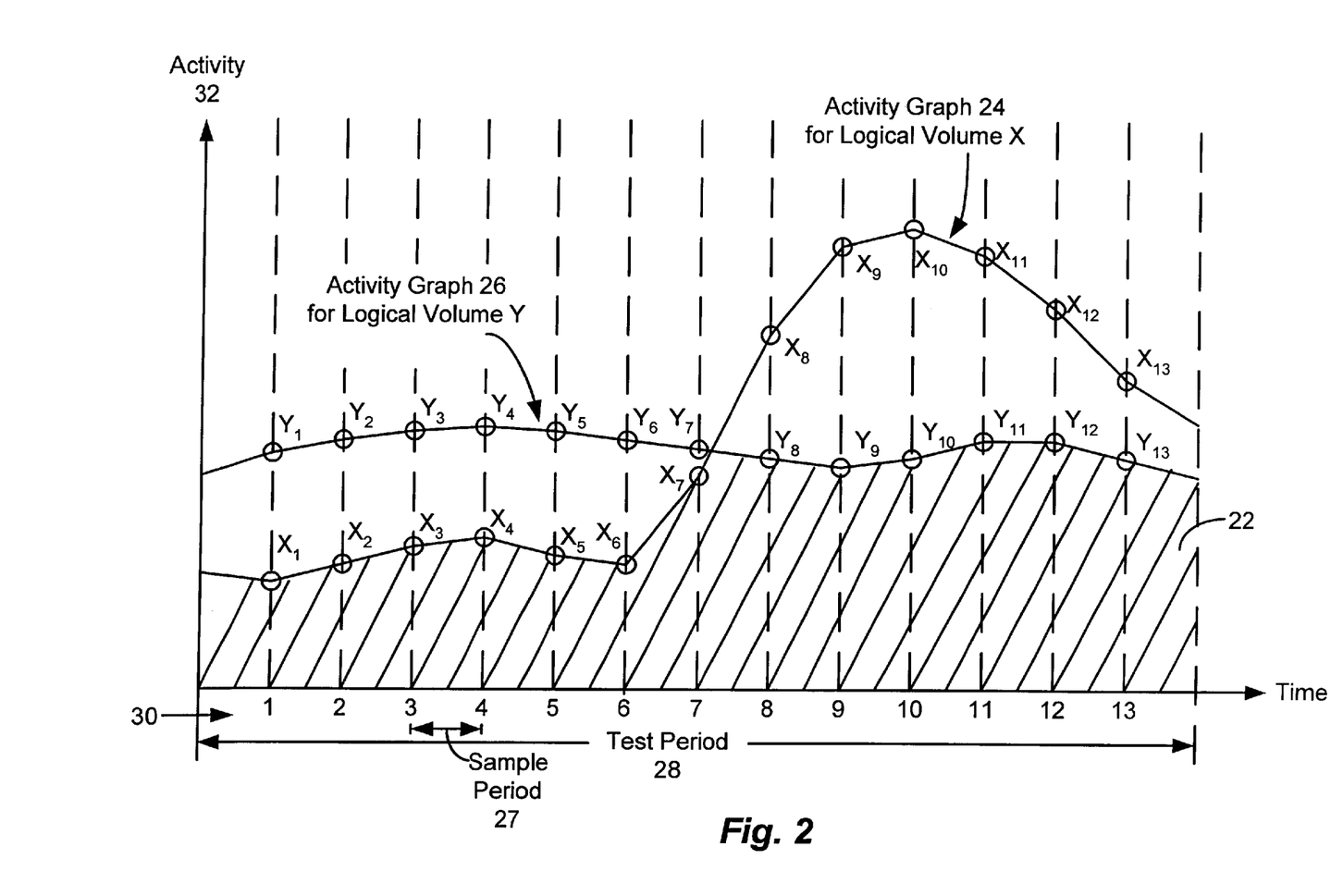
FIG. 2 shows activity graphs for a pair of logical volumes, with a minimum area shaded.

As shown in FIG. 2, the minimum area used in connection with the disclosed area ratio criteria is defined as the area 22 lying below both the activity graphs. FIG. 2 shows an activity graph 24 for a logical volume X, and an activity graph 26 for a logical volume Y. Each of the activity graphs in FIG. 2 includes a number of activity level sample values, shown as activity level sample values $X_1$ through $X_{13}$ for activity graph 24, and as activity level sample values $Y_1$ through $Y_{13}$ for activity graph 26. The sample values shown in FIG. 2 are captured at sample points 30 during a test period 28. The duration of the test period 28, as well as the sample periods 27 between individual ones of the sample times 30, are implementation specific, and those skilled in the art will recognize that the disclosed system is applicable using various values for these parameters. Further in the illustrative embodiment of FIG. 2, the activity level axis 32 for the activity graphs 24 and 26 15 reflects numbers of logical volume activity units detected during the sample periods between the sample times 30.

Figure 3:
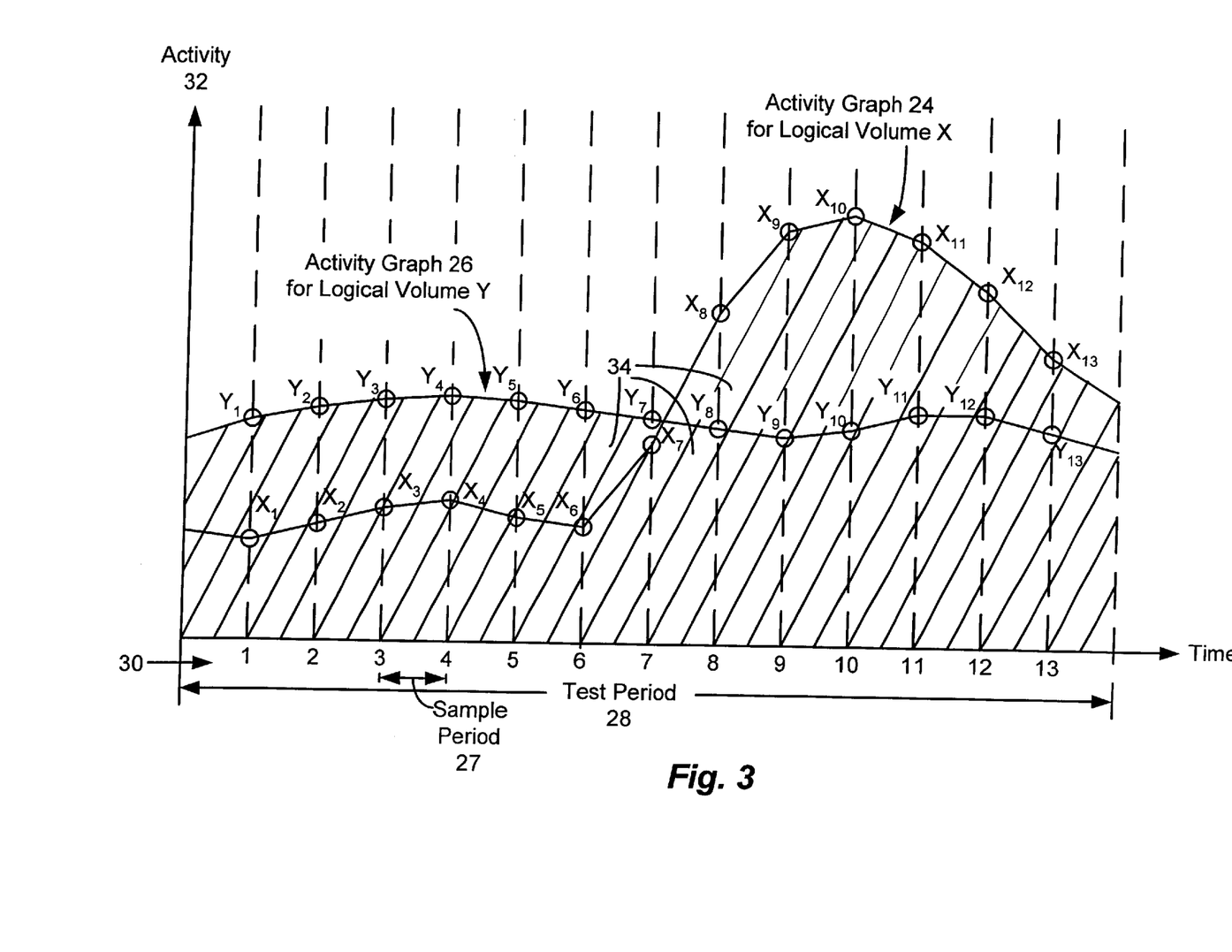
FIG. 3 shows activity graphs for a pair of logical volumes, with a maximum area shaded.

FIG. 3 illustrates the maximum area used in connection with the disclosed area ratio criteria. As shown in FIG. 3, the maximum area used in connection with the disclosed area ratio criteria is defined as the shaded area 34 lying below either one or the other of the activity graphs 24 or 26.

Using the disclosed area ratio criteria, the activity graphs of two logical volumes are determined to be correlated in the event that the ratio of the minimum area of the two graphs to the maximum area of the two graphs is at least as great as a predetermined threshold. An appropriate area ratio threshold may, for example, be determined empirically for a given application, such that pairs of activity graphs which have an area ratio at least as large as the threshold area ratio value are considered correlated under appropriate conditions in order to prevent potential or actual performance degradation.

Figure 4:
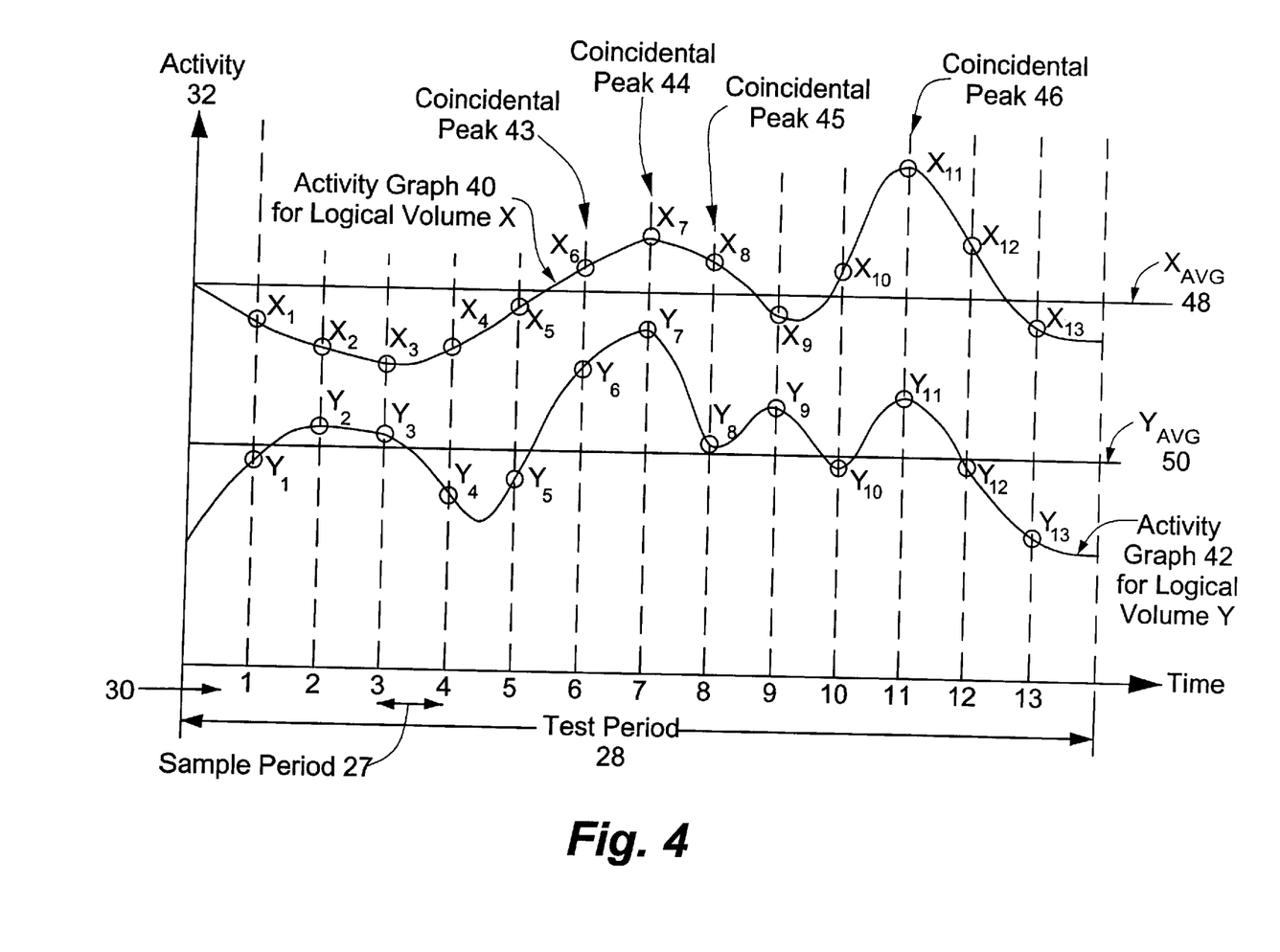
FIG. 4 shows activity graphs for a pair of logical volumes, and illustrates four coincidental peaks.

In another embodiment of the disclosed system, the criteria employed to determine if the activity graphs of two logical volumes are correlated is a peak ratio criteria. As illustrated in FIG. 4, the peak ratio criteria indicates that one activity graph is correlated to another activity graph if a peak ratio described by the two activity graphs is at least as large as a predetermined peak ratio threshold. The peak ratio for the two activity graphs being compared is a ratio between the number of coincidental peaks in the two graphs, and the difference between the total number of peaks in the two graphs and the number of coincidental peaks. Accordingly, the peak ratio criteria, which ranges between 0 and 1, may be expressed in terms of the following equation:

$$\text{PEAK RATIO} = \frac{\#\_\text{coincidental\_peaks\_in\_X\_and\_Y}}{\#\_\text{peaks\_in\_X} + \#\_\text{peaks\_in\_Y} - \#\_\text{coincidental\_peaks\_in\_X\_and\_Y}}$$

The number of coincidental peaks may, for example, be defined as the number of peaks in one of the activity graphs which occur at the same time as peaks in the other activity graph. Further for purposes of illustration, a peak within an activity graph may be defined as an activity level sample which is above the average activity level for its activity graph, plus a predetermined offset value. Alternatively, or in addition, a peak within an activity graph may be defined as an activity level sample at least as large as the average activity level for the activity graph multiplied by a predetermined value. Appropriate predetermined offset and/or multiplier values may be determined empirically for specific applications. In one embodiment, a peak within an activity graph is declared in the event that a) the activity level for a given sample is at least as great as the average activity level for the activity graph plus 1 logical volume activity level unit, or b) the activity level for a given sample is at least as great as 1.25 times the average activity level for the activity graph, and the activity level for that sample is at least as great as the average activity level for the activity graph within the respective test period plus 0.1 logical volume activity level units.

FIG. 4 shows coincidental peaks 43, 44, 45 and 46 for the activity graphs 40 and 42. As shown in FIG. 4, the sample value $X_7$ is above the average sample value 48 for activity graph 40, and the sample value $Y_7$ is above the average sample value 50 for activity graph 42. Accordingly, in an embodiment in which peaks are counted as any sample value above the average sample value for the respective activity graph, coincidental peaks 43, 44, 45 and 46 would occur at corresponding sample points 6, 7, 8 and 11 during the test period 28. Alternatively, in an illustrative embodiment in which peaks are counted for only sample values that are at least as great as the respective activity graph average plus an offset, or in an illustrative embodiment in which peaks are counted for only sample values that are at least as great as the respective activity graph average times a multiplier, the sample values $X_7$ and $Y_7$ may also be considered a coincidental peak, depending on the specific offset and/or multiplier values used. The specific approach employed to determine coincidental peaks is performed for each pair of sample point values $X_i$ and $Y_i$. For example, with reference to the graphs in FIG. 4, in one embodiment, the value $Y_8$ may not exceed the threshold to qualify for a peak, while $X_6$, $Y_6$, $X_7$, $Y_7$, $X_8$, $X_{11}$, and $Y_{11}$ may still exceed the threshold.

In such a case, the system would determine only three coincidental peaks were present in the activity graphs shown in FIG. 4, for example as indicated by reference numerals 43, 44 and 46. Moreover, in a further alternative embodiment, the definition of a peak within an activity graph may be modified or extended to utilize or include an arbitrary threshold that is independent of average activity levels.

As with the predetermined area ratio threshold, the predetermined peak ratio threshold may, for example, be determined empirically for a given application, such that pairs of activity graphs which have a peak ratio at least as large as the peak ratio threshold value are considered correlated at appropriate times with respect to preventing potential or actual performance degradation.

Figure 5:
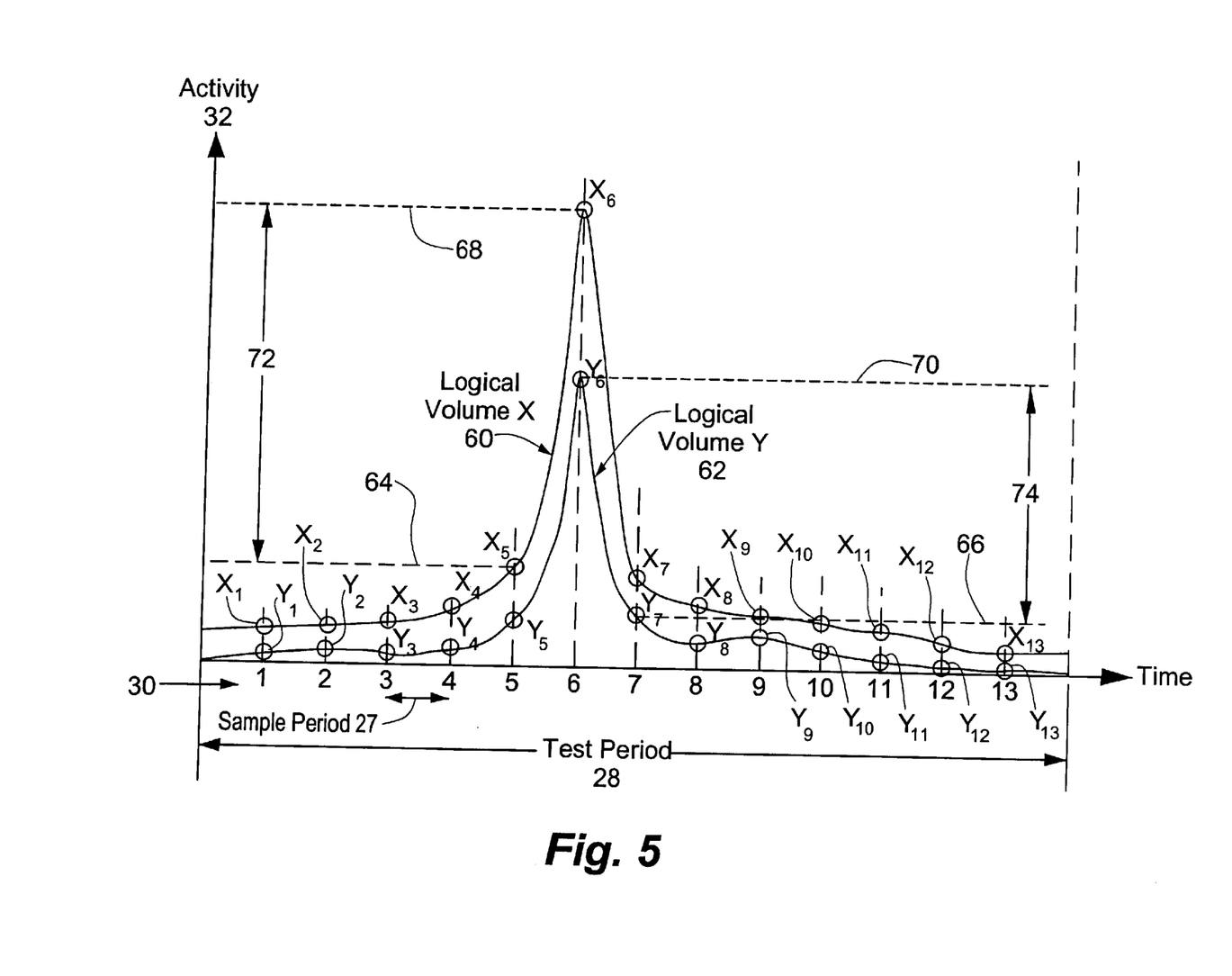
FIG. 5 shows activity graphs for a pair of logical volumes and illustrates the disclosed sharp peak based correlation criteria.

As shown in FIG. 5, a further illustrative embodiment of the disclosed system may include a sharp peak criteria. The disclosed sharp peak criteria indicates that one activity graph is correlated to another in the event that the two activity graphs have a coincidental sharp peak. For purposes of illustration, a sharp peak is shown at sample point 6 in FIG. 5, corresponding to the sample values $X_6$ and $Y_6$. As disclosed herein, a coincidental sharp peak is determined to have occurred in the event that each of the following conditions are met:

(1) The highest activity level samples of both logical volumes, during the relevant test period, occur at the same time. The highest activity levels in FIG. 5 are shown as activity level 68 for logical volume X, and activity level 70 for logical volume Y.

(2) The highest activity level sample of each logical volume is sufficiently greater than the next highest activity level sample. The next highest activity levels in FIG. 5 are shown as activity level 66 for logical volume Y, and activity level 64 for logical volume X. In an illustrative embodiment, the highest activity level sample of each logical volume must be at least as great as a product of a next highest activity level and a predetermined multiplier. Thus, using FIG. 5 as a reference, the activity level 68 would need to be at least as great as a predetermined multiple of activity level 64, and activity level 70 would need to be at least as great as a predetermined multiple of activity level 66. Alternatively, the disclosed system could determine whether a difference 72 between the activity level 64 and the activity level 68 were at least as great as a predetermined value, and whether the difference 74 between the activity level 70 and the activity level 66 were at least as great as the same or another predetermined value.

(3) A value of a correlation coefficient for the two activity graphs must be greater than a predetermined threshold correlation coefficient value.

In the event that all three of the above criteria are satisfied, an embodiment of the disclosed system would determine that the activities of the logical volumes associated with the activity graphs being compared were correlated according to the sharp peak criteria.

In addition to any of the correlation criteria described in connection with FIGS. 2–5, the disclosed system may further employ a correlation coefficient criteria. In such an embodiment, the correlation coefficient criteria would employ a standard correlation coefficient technique to determine a correlation coefficient for the two activity graphs being compared.

Figure 6:
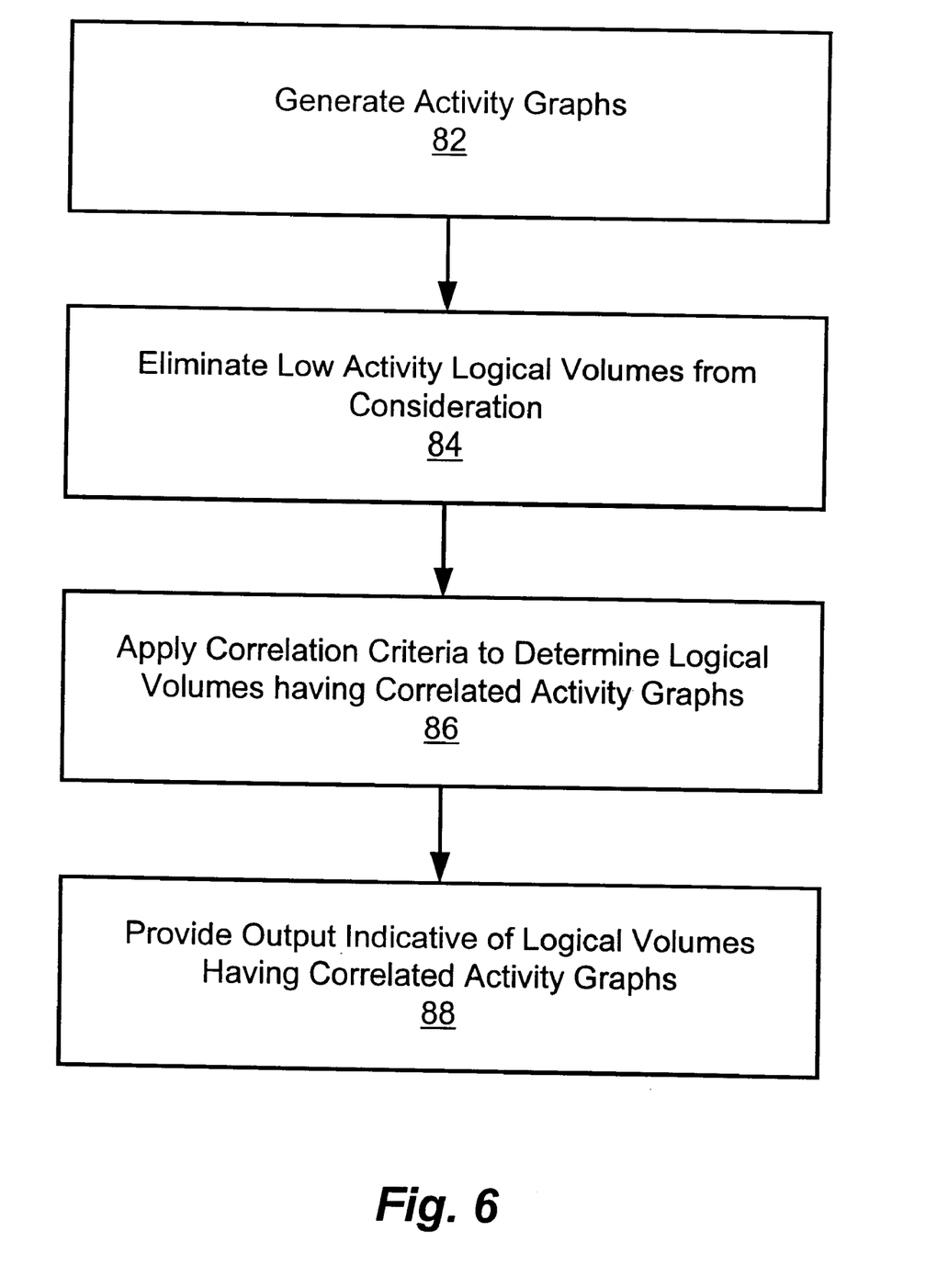
FIG. 6 is a flow chart showing steps performed in an illustrative embodiment of the disclosed system.

FIG. 6 is a flow chart showing steps performed in an illustrative embodiment of the disclosed system. At step 82, the activity graphs for the logical volumes to be compared are generated. The test period over which samples are obtained may be any appropriate length of time for a given application of the disclosed system. Moreover, the sample periods between sample points may further be designed for a specific application or embodiment. As described above, the activity levels used in an illustrative embodiment reflect a number of I/O transactions occurring with regard to the associated logical volume over the relevant sample period.

At step 84, the disclosed system may eliminate any low activity logical volumes from consideration. If a predetermined number of sample values do not exceed a predetermined activity level within a given test period, then a determination is made that insufficient statistical information is available for the corresponding logical volume during that test period. If, for example, a total of fewer than 600 logical volume activity level units were detected for a given logical volume during each 10 minute sample period within a complete test period, then the average number of activity level units per second would be less than 1.0—statistically too small for a meaningful application of the disclosed correlation criteria. Accordingly, any activity graph for a logical volume over such a test period would be discarded. Those skilled in the art will recognize that the values used in the preceding example are for purposes of illustration only, and that various other minimum activity level thresholds may be applicable in alternative implementations or embodiments.

At step 86 the disclosed system applies various ones of the correlation criteria described in connection with FIGS. 2–5, and potentially also a conventional correlation coefficient based criteria, in order to determine whether the respective I/O activity graphs of two logical volumes are correlated. In an illustrative embodiment, a correlation is found between two activity graphs if the area ratio of the two graphs is above a first predetermined area ratio threshold. Similarly, a correlation between two activity graphs may be found in the case where the area ratio of the two graphs exceeds a second predetermined area ratio threshold, smaller than the first predetermined area threshold, and where the peak ratio of the two activity graphs exceeds a first peak ratio threshold. Additionally, in the event that two activity graphs have a peak ratio above a predetermined peak ratio threshold, as well as a coefficient correlation value above a predetermined coefficient correlation value, then the two activity graphs are considered correlated. Furthermore, in an illustrative embodiment, two activity graphs may be considered to be correlated in the event that they include a coincidental sharp peak.

Different combinations of all or some of the disclosed correlation criteria may be used to determine whether activity graphs of logical volumes are correlated at step 86. Such combinations of all or some of the disclosed correlation criteria may further be used to determine the level of correlation between activity graphs of logical volumes. In this way, some or all of the disclosed correlation criteria may be used to determine how "strong" a correlation exists between the activity graphs of logical volumes.

For example, in one illustrative embodiment the following levels of correlation criteria may be chosen:

A. Logical volumes are "STRONGLY" correlated if:
AREA RATIO>=0.4 and PEAK RATIO>=0.4

B. Logical volumes are "MEDIUM STRONGLY" correlated if:
AREA RATIO>=0.70 or (PEAK RATIO>0.70 and CORRELATION COEFFICIENT>0.7)

C. Logical volumes are "WEAKLY" correlated if any one of the following three conditions is true, as may be determined by applying a logical "OR" operation to the following three conditions:
1. AREA RATIO>=0.333 or PEAK RATIO>=0.4; OR
2. PEAK RATIO>=0.333 and (Correlation Coefficient >=0.1 or AREA RATIO>=0.1); OR
3. SHARP PEAK=TRUE At step 88, in the event that the disclosed system determines that two activity graphs are correlated by some correlation criteria, an indication of that determination may be generated, so that corrective action may be performed. Such indication may take the form of a message sent to a resource/configuration manager or entity, which may then take any form of corrective action that may be appropriate.

Those skilled in the art should readily appreciate that programs defining the functions of the present invention can be delivered to an execution platform in many forms; including, but not limited to: (a) information permanently stored on non-writable storage media (e.g. read only memory devices such as ROM or CD-ROM disks); (b) information alterably stored on writable storage media (e.g. floppy disks, R/W CD-ROMS, and hard drives); or (c) information conveyed through communication media for example using baseband signaling or broadband signaling techniques, including carrier wave signaling techniques, such as over computer or telephone networks via a modem. In addition, while the invention may be embodied in computer software, the functions necessary to implement the invention may alternatively be embodied in part or in whole using hardware components such as Application Specific Integrated Circuits, FPLAs, or other hardware, or some combination of hardware components and software.

While the invention is described through the above exemplary embodiments, it will be understood by those of ordinary skill in the art that modification to and variation of the illustrated embodiments may be made without departing from the inventive concepts herein disclosed. Moreover, while the preferred embodiments may be described in connection with various illustrative data structures, one skilled in the art will recognize that the system may be embodied using a variety of specific data structures. Accordingly, the invention should not be viewed as limited except by the scope and spirit of the appended claims.

What is claimed is:

1. A method for determining whether activity graphs for logical volumes of data storage are correlated, comprising:
    generating a first activity graph, said first activity graph including a series of activity level sample values associated with a first logical volume over a period of time;
    generating a second activity graph, said second activity graph including a series of activity level sample values associated with a second logical volume over said period of time;
    determining whether said first activity graph and said second activity graph are correlated, said determining based at least in part on an area ratio criteria, said area ratio criteria indicating that said first activity graph and said second activity graph are correlated in the event that an area ratio is at least as great as a predetermined value, wherein said area ratio comprises a ratio between a minimum area and a maximum area, wherein said minimum area is an area below both said first activity graph and said second activity graph, and wherein said maximum area is an area below at least one of the set consisting of said first activity graph and said second activity graph; and
    in the event that said first activity graph and said second activity graph are determined to be correlated, generating an output indicative of said correlation.

2. A method for determining whether activity graphs for logical volumes of data storage are correlated, comprising:
    generating a first activity graph, said first activity graph including a series of activity level sample values associated with a first logical volume over a period of time;
    generating a second activity graph, said second activity graph including a series of activity level sample values associated with a second logical volume over said period of time;
    determining whether said first activity graph and said second activity graph are correlated, wherein said determining whether said first activity graph and said second activity graph are correlated is based, at least in part, on a peak ratio criteria, said peak ratio criteria indicating that said first activity graph and said second activity graph are correlated in the event that a peak ratio is at least as large as a second predetermined value, wherein said peak ratio comprises a ratio between a number of coincidental peaks and the difference between a total number of peaks in both said activity graphs and said number of coincidental peaks, wherein said number of coincidental peaks is the number of peaks in said first activity graph which occur at the same time as respective peaks in said second activity graph; and
    in the event that said first activity graph and said second activity graph are determined to be correlated, generating an output indicative of said correlation.

3. The method of claim 2, further comprising determining an activity level sample value to be a peak in the event that said activity level sample value is at least as great as an average activity level for the respective activity graph.

4. The method of claim 2, further comprising determining an activity level sample value to be a peak in the event that said activity level sample value is at least as great as the sum of an average activity level for the respective activity graph and a predetermined offset value.

5. The method of claim 2, further comprising determining an activity level sample value to be a peak in the event that said activity level sample value is at least as great as the product of an average activity level for the respective activity graph and a predetermined multiplier value.

6. The method of claim 2, further comprising further comprising determining an activity level sample value to be a peak in the event that said activity level sample value is at least as great as the product of an average activity level for the respective activity graph and a predetermined multiplier value, plus a predetermined offset.

7. A method for determining whether activity graphs for logical volumes of data storage are correlated, comprising:
    generating a first activity graph, said first activity graph including a series of activity level sample values associated with a first logical volume over a period of time;
    generating a second activity graph, said second activity graph including a series of activity level sample values associated with a second logical volume over said period of time;
    determining whether said first activity graph and said second activity graph are correlated, wherein said determining whether said first activity graph and said second activity graph are correlated is based, at least in part, on a sharp peak criteria, said sharp peak criteria indicating that said first activity graph and said second activity graph are correlated in the event that said first activity graph and said second activity graph have at least one pair of coincidental peaks, wherein each one of said coincidental peaks is a sharp peak, and wherein each said sharp peak includes a highest activity level of a respective one of said first and second activity graphs, wherein each said sharp peak is at least as great as a product of a next highest activity level in said respective one of said activity graphs and a predetermined multiplier, and wherein sharp peak criteria further only indicates that said first activity graph and said second activity graph are correlated in the event that a correlation coefficient for said first activity graph and said second activity graph is greater than a predetermined correlation coefficient value; and in the event that said first activity graph and said second activity graph are determined to be correlated, generating an output indicative of said correlation.

8. A method for determining whether activity graphs for logical volumes of data storage are correlated, comprising:

generating a first activity graph, said first activity graph including a series of activity level sample values associated with a first logical volume over a period of time;

generating a second activity graph, said second activity graph including a series of activity level sample values associated with a second logical volume over said period of time;

determining whether said first activity graph and said second activity graph are correlated, said determining based at least in part on at least two criteria selected from the criteria set consisting of:

an area ratio criteria, said area ratio criteria indicating that said first activity graph and said second activity graph are correlated in the event that an area ratio is at least as great as a predetermined value, wherein said area ratio comprises a ratio between a minimum area and a maximum area, wherein said minimum area is an area below both said first activity graph and said second activity graph, and wherein said maximum area is an area below at least one of the set consisting of said first activity graph and said second activity graph, a peak ratio criteria, said peak ratio criteria indicating that said first activity graph and said second activity graph are correlated in the event that a peak ratio is at least as large as a second predetermined value, wherein said peak ratio comprises a ratio between a number of coincidental peaks and the difference between a total number of peaks in both said activity graphs and said number of coincidental peaks, wherein said number of coincidental peaks is the number of peaks in said first activity graph which occur at the same time as respective peaks in said second activity graph, a sharp peak criteria, said sharp peak criteria indicating that said first activity graph and said second activity graph are correlated in the event that said first activity graph and said second activity graph have at least one pair of coincidental peaks, wherein each one of said coincidental peaks is a sharp peak, and wherein each said sharp peak includes a highest activity level of a respective one of said first and second activity graphs, wherein each said sharp peak is at least as great as a product of a next highest activity level in said respective one of said activity graphs and a predetermined multiplier, and wherein said sharp peak criteria further only indicates that said first activity graph and said second activity graph are correlated in the event that a correlation coefficient for said first activity graph and said second activity graph is greater than a predetermined correlation coefficient value, and a correlation coefficient criteria, said correlation coefficient criteria indicating that said first activity graph and said second activity graph are correlated in the event that a correlation coefficient for said first activity graph and said second activity graph is greater than a predetermined correlation coefficient value; and in the event that said first activity graph and said second activity graph are determined to be correlated, generating an output indicative of said correlation.

9. A system for determining whether activity graphs for logical volumes of data storage are correlated, comprising:

at least one storage disk;

at least one adapter, said adapter operable to:

generate a first activity graph, said first activity graph including a series of activity level sample values associated with a first logical volume over a period of time, wherein said first logical volume describes at least one storage area on said at least one storage disk, generate a second activity graph, said second activity graph including a series of activity level sample values associated with a second logical volume over said period of time, wherein said second logical volume describes at least one storage area on said at least one storage disk, determine whether said first activity graph and said second activity graph are correlated, said determination responsive, at least in part, to an area ratio criteria, said area ratio criteria indicating that said first activity graph and said second activity graph are correlated in the event that an area ratio is at least as great as a predetermined value, wherein said area ratio comprises a ratio between a minimum area and a maximum area, wherein said minimum area is an area below both said first activity graph and said second activity graph, and wherein said maximum area is an area below at least one of the set consisting of said first activity graph and said second activity graph, in the event that said first activity graph and said second activity graph are determined to be correlated, generate an output indicative of said correlation.

10. A system for determining whether activity graphs for logical volumes of data storage are correlated, comprising:

at least one storage disk;

at least one adapter, said adapter operable to:

generate a first activity graph, said first activity graph including a series of activity level sample values associated with a first logical volume over a period of time, wherein said first logical volume describes at least one storage area on said at least one storage disk, generate a second activity graph, said second activity graph including a series of activity level sample values associated with a second logical volume over said period of time, wherein said second logical volume describes data stored on said at least one storage disk, determine whether said first activity graph and said second activity graph are correlated, said determination responsive, at least in part, to a peak ratio criteria, said peak ratio criteria indicating that said first activity graph and said second activity graph are correlated in the event that a peak ratio is at least as large as a second predetermined value, wherein said peak ratio comprises a ratio between a number of coincidental peaks and the difference between a total number of peaks in both said activity graphs and said number of coincidental peaks, wherein said number of coincidental peaks is the number of peaks in said first activity graph which occur at the same time as respective peaks in said second activity graph, in the event that said first activity graph and said second activity graph are determined to be correlated, generate an output indicative of said correlation.

11. The system of claim 10, wherein said at least one adapter is further operable to determine an activity level sample value to be a peak in the event that said activity level sample value is at least as great as an average activity level for the respective activity graph.

12. The system of claim 10, wherein said at least one adapter is further operable to determine an activity level sample value to be a peak in the event that said activity level sample value is at least as great as the sum of an average activity level for the respective activity graph and a predetermined offset value.

13. The system of claim 10, wherein said at least one adapter is further operable to determine an activity level sample value to be a peak in the event that said activity level sample value is at least as great as the product of an average activity level for the respective activity graph and a predetermined multiplier value.

14. The system of claim 10, wherein said at least one adapter is further operable to determine an activity level sample value to be a peak in the event that said activity level sample value is at least as great as the product of an average activity level for the respective activity graph and a predetermined multiplier value, plus a predetermined offset.

15. A system for determining whether activity graphs for logical volumes of data storage are correlated, comprising:
at least one storage disk;
at least one adapter, said adapter operable to:
generate a first activity graph, said first activity graph including a series of activity level sample values associated with a first logical volume over a period of time, wherein said first logical volume describes at least one storage area on said at least one storage disk,
generate a second activity graph, said second activity graph including a series of activity level sample values associated with a second logical volume over said period of time, wherein said second logical volume describes at least one storage area on said at least one storage disk,
determine whether said first activity graph and said second activity graph are correlated, said determination responsive, at least in part, to a sharp peak criteria, said sharp peak criteria indicating that said first activity graph and said second activity graph are correlated in the event that said first activity graph and said second activity graph have at least one pair of coincidental peaks, wherein each one of said coincidental peaks is a sharp peak, and wherein each said sharp peak includes a highest activity level of a respective one of said first and second activity graphs, wherein each said sharp peak is at least as great as a product of a next highest activity level in said respective one of said activity graphs and a predetermined multiplier, and wherein sharp peak criteria further only indicates that said first activity graph and said second activity graph are correlated in the event that a correlation coefficient for said first activity graph and said second activity graph is greater than a predetermined correlation coefficient value, and
in the event that said first activity graph and said second activity graph are determined to be correlated, generate an output indicative of said correlation.

16. A system for determining whether activity graphs for logical volumes of data storage are correlated, comprising:
at least one storage disk;
at least one adapter, said adapter operable to:
generate a first activity graph, said first activity graph including a series of activity level sample values associated with a first logical volume over a period of time,
generate a second activity graph, said second activity graph including a series of activity level sample values associated with a second logical volume over said period of time,
determine whether said first activity graph and said second activity graph are correlated, said determining based at least in part on at least two criteria selected from the criteria set consisting of:
an area ratio criteria, said area ratio criteria indicating that said first activity graph and said second activity graph are correlated in the event that an area ratio is at least as great as a predetermined value, wherein said area ratio comprises a ratio between a minimum area and a maximum area, wherein said minimum area is an area below both said first activity graph and said second activity graph, and wherein said maximum area is an area below at least one of the set consisting of said first activity graph and said second activity graph,
a peak ratio criteria, said peak ratio criteria indicating that said first activity graph and said second activity graph are correlated in the event that a peak ratio is at least as large as a second predetermined value, wherein said peak ratio comprises a ratio between a number of coincidental peaks and the difference between a total number of peaks in both said activity graphs and said number of coincidental peaks, wherein said number of coincidental peaks is the number of peaks in said first activity graph which occur at the same time as respective peaks in said second activity graph,
a sharp peak criteria, said sharp peak criteria indicating that said first activity graph and said second activity graph are correlated in the event that said first activity graph and said second activity graph have at least one pair of coincidental peaks, wherein each one of said coincidental peaks is a sharp peak, and wherein each said sharp peak includes a highest activity level of a respective one of said first and second activity graphs, wherein each said sharp peak is at least as great as a product of a next highest activity level in said respective one of said activity graphs and a predetermined multiplier, and wherein said sharp peak criteria further only indicates that said first activity graph and said second activity graph are correlated in the event that a correlation coefficient for said first activity graph and said second activity graph is greater than a predetermined correlation coefficient value, and
a correlation coefficient criteria, said correlation coefficient criteria indicating that said first activity graph and said second activity graph are correlated in the event that a correlation coefficient for said first activity graph and said second activity graph is greater than a predetermined correlation coefficient value; and in the event that said first activity graph and said second activity graph are determined to be correlated, generate an output indicative of said correlation.

17. A system for determining whether activity graphs for logical volumes of data storage are correlated, comprising:

means for generating a first activity graph, said first activity graph including a series of activity level sample values associated with a first logical volume over a period of time, wherein said first logical volume describes at least one storage area on said at least one storage disk;

means for generating a second activity graph, said second activity graph including a series of activity level sample values associated with a second logical volume over said period of time, wherein said second logical volume describes at least one storage area on said at least one storage disk;

means for determining whether said first activity graph and said second activity graph are correlated, said determining responsive, at least in part, to an area ratio criteria, said area ratio criteria indicating that said first activity graph and said second activity graph are correlated in the event that an area ratio is at least as great as a predetermined value, wherein said area ratio comprises a ratio between a minimum area and a maximum area, wherein said minimum area is an area below both said first activity graph and said second activity graph, and wherein said maximum area is an area below at least one of the set consisting of said first activity graph and said second activity graph; and means for, in the event that said first activity graph and said second activity graph are determined to be correlated, generating an output indicative of said correlation.

18. A system for determining whether activity graphs for logical volumes of data storage are correlated, comprising:

means for generating a first activity graph, said first activity graph including a series of activity level sample values associated with a first logical volume over a period of time, wherein said first logical volume describes at least one storage area on said at least one storage disk;

means for generating a second activity graph, said second activity graph including a series of activity level sample values associated with a second logical volume over said period of time, wherein said second logical volume describes at least one storage area on said at least one storage disk;

means for determining whether said first activity graph and said second activity graph are correlated, said determining responsive, at least in part, to a peak ratio criteria, said peak ratio criteria indicating that said first activity graph and said second activity graph are correlated in the event that a peak ratio is at least as large as a second predetermined value, wherein said peak ratio comprises a ratio between a number of coincidental peaks and the difference between a total number of peaks in both said activity graphs and said number of coincidental peaks, wherein said number of coincidental peaks is the number of peaks in said first activity graph which occur at the same time as respective peaks in said second activity graph; and means for, in the event that said first activity graph and said second activity graph are determined to be correlated, generating an output indicative of said correlation.

19. The system of claim 18, further comprising means for determining an activity level sample value to be a peak in the event that said activity level sample value is at least as great as an average activity level for the respective activity graph.

20. The system of claim 18, further comprising means for determining an activity level sample value to be a peak in the event that said activity level sample value is at least as great as the sum of an average activity level for the respective activity graph and a predetermined offset value.

21. The system of claim 18, further comprising means for determining an activity level sample value to be a peak in the event that said activity level sample value is at least as great as the product of an average activity level for the respective activity graph and a predetermined multiplier value.

22. The system of claim 18, further comprising means for determining an activity level sample value to be a peak in the event that said activity level sample value is at least as great as the product of an average activity level for the respective activity graph and a predetermined multiplier value, plus a predetermined offset.

23. A system for determining whether activity graphs for logical volumes of data storage are correlated, comprising:

means for generating a first activity graph, said first activity graph including a series of activity level sample values associated with a first logical volume over a period of time, wherein said first logical volume describes at least one storage area on said at least one storage disk;

means for generating a second activity graph, said second activity graph including a series of activity level sample values associated with a second logical volume over said period of time, wherein said second logical volume describes at least one storage area on said at least one storage disk;

means for determining whether said first activity graph and said second activity graph are correlated, said determining responsive, at least in part, to a sharp peak criteria, said sharp peak criteria indicating that said first activity graph and said second activity graph are correlated in the event that said first activity graph and said second activity graph have at least one pair of coincidental peaks, wherein each one of said coincidental peaks is a sharp peak, and wherein each said sharp peak includes a highest activity level of a respective one of said first and second activity graphs, wherein each said sharp peak is at least as great as a product of a next highest activity level in said respective one of said activity graphs and a predetermined multiplier, and wherein sharp peak criteria further only indicates that said first activity graph and said second activity graph are correlated in the event that a correlation coefficient for said first activity graph and said second activity graph is greater than a predetermined correlation coefficient value; and means for, in the event that said first activity graph and said second activity graph are determined to be correlated, generating an output indicative of said correlation.

24. A system for determining whether activity graphs for logical volumes of data storage are correlated, comprising:

means for generating a first activity graph, said first activity graph including a series of activity level sample values associated with a first logical volume over a period of time;

means for generating a second activity graph, said second activity graph including a series of activity level sample values associated with a second logical volume over said period of time;

means for determining whether said first activity graph and said second activity graph are correlated, said determining based at least in part on at least two criteria selected from the criteria set consisting of:

an area ratio criteria, said area ratio criteria indicating that said first activity graph and said second activity graph are correlated in the event that an area ratio is at least as great as a predetermined value, wherein said area ratio comprises a ratio between a minimum area and a maximum area, wherein said minimum area is an area below both said first activity graph and said second activity graph, and wherein said maximum area is an area below at least one of the set consisting of said first activity graph and said second activity graph, a peak ratio criteria, said peak ratio criteria indicating that said first activity graph and said second activity graph are correlated in the event that a peak ratio is at least as large as a second predetermined value, wherein said peak ratio comprises a ratio between a number of coincidental peaks and the difference between a total number of peaks in both said activity graphs and said number of coincidental peaks, wherein said number of coincidental peaks is the number of peaks in said first activity graph which occur at the same time as respective peaks in said second activity graph, a sharp peak criteria, said sharp peak criteria indicating that said first activity graph and said second activity graph are correlated in the event that said first activity graph and said second activity graph have at least one pair of coincidental peaks, wherein each one of said coincidental peaks is a sharp peak, and wherein each said sharp peak includes a highest activity level of a respective one of said first and second activity graphs, wherein each said sharp peak is at least as great as a product of a next highest activity level in said respective one of said activity graphs and a predetermined multiplier, and wherein said sharp peak criteria further only indicates that said first activity graph and said second activity graph are correlated in the event that a correlation coefficient for said first activity graph and said second activity graph is greater than a predetermined correlation coefficient value, and a correlation coefficient criteria, said correlation coefficient criteria indicating that said first activity graph and said second activity graph are correlated in the event that a correlation coefficient for said first activity graph and said second activity graph is greater than a predetermined correlation coefficient value; and in the event that said first activity graph and said second activity graph are determined to be correlated, generating an output indicative of said correlation.

25. A computer program product including a computer readable medium, said computer readable medium having a computer program stored thereon, said program for determining whether activity graphs for logical volumes of data storage are correlated, said program comprising:

program code for generating a first activity graph, said first activity graph including a series of activity level sample values associated with a first logical volume over a period of time, wherein said first logical volume describes at least one storage area on said at least one storage disk;

program code for generating a second activity graph, said second activity graph including a series of activity level sample values associated with a second logical volume over said period of time, wherein said second logical volume describes at least one storage area on said at least one storage disk;

program code for determining whether said first activity graph and said second activity graph are correlated, said determining responsive, at least in part, to an area ratio criteria, said area ratio criteria indicating that said first activity graph and said second activity graph are correlated in the event that an area ratio is at least as great as a predetermined value, wherein said area ratio comprises a ratio between a minimum area and a maximum area, wherein said minimum area is an area below both said first activity graph and said second activity graph, and wherein said maximum area is an area below at least one of the set consisting of said first activity graph and said second activity graph; and program code for, in the event that said first activity graph and said second activity graph are determined to be correlated, generating an output indicative of said correlation.

26. A computer program product including a computer readable medium, said computer readable medium having a computer program stored thereon, said program for determining whether activity graphs for logical volumes of data storage are correlated, said program comprising:

program code for generating a first activity graph, said first activity graph including a series of activity level sample values associated with a first logical volume over a period of time, wherein said first logical volume describes at least one storage area on said at least one storage disk;

program code for generating a second activity graph, said second activity graph including a series of activity level sample values associated with a second logical volume over said period of time, wherein said second logical volume describes at least one storage area on said at least one storage disk;

program code for determining whether said first activity graph and said second activity graph are correlated, said determining responsive, at least in part, to a peak ratio criteria, said peak ratio criteria indicating that said first activity graph and said second activity graph are correlated in the event that a peak ratio is at least as large as a second predetermined value, wherein said peak ratio comprises a ratio between a number of coincidental peaks and the difference between a total number of peaks in both said activity graphs and said number of coincidental peaks, wherein said number of coincidental peaks is the number of peaks in said first activity graph which occur at the same time as respective peaks in said second activity graph; and program code for, in the event that said first activity graph and said second activity graph are determined to be correlated, generating an output indicative of said correlation.

27. The computer program product of claim 26, further comprising program code for determining an activity level sample value to be a peak in the event that said activity level sample value is at least as great as an average activity level for the respective activity graph.

28. The computer program product of claim 26, further comprising program code for determining an activity level sample value to be a peak in the event that said activity level sample value is at least as great as the sum of an average activity level for the respective activity graph and a predetermined offset value.

29. The computer program product of claim 26, further comprising program code for determining an activity level sample value to be a peak in the event that said activity level sample value is at least as great as the product of an average activity level for the respective activity graph and a predetermined multiplier value.

30. The computer program product of claim 26, further comprising further comprising determining an activity level sample value to be a peak in the event that said activity level sample value is at least as great as the product of an average activity level for the respective activity graph and a predetermined multiplier value, plus a predetermined offset.

31. A computer program product including a computer readable medium, said computer readable medium having a computer program stored thereon, said program for determining whether activity graphs for logical volumes of data storage are correlated, said program comprising:

program code for generating a first activity graph, said first activity graph including a series of activity level sample values associated with a first logical volume over a period of time, wherein said first logical volume describes at least one storage area on said at least one storage disk;

program code for generating a second activity graph, said second activity graph including a series of activity level sample values associated with a second logical volume over said period of time, wherein said second logical volume describes at least one storage area on said at least one storage disk;

program code for determining whether said first activity graph and said second activity graph are correlated, said determining responsive, at least in part, to a sharp peak criteria, said sharp peak criteria indicating that said first activity graph and said second activity graph are correlated in the event that said first activity graph and said second activity graph have at least one pair of coincidental peaks, wherein each one of said coincidental peaks is a sharp peak, and wherein each said sharp peak includes a highest activity level of a respective one of said first and second activity graphs, wherein each said sharp peak is at least as great as a product of a next highest activity level in said respective one of said activity graphs and a predetermined multiplier, and wherein sharp peak criteria further only indicates that said first activity graph and said second activity graph are correlated in the event that a correlation coefficient for said first activity graph and said second activity graph is greater than a predetermined correlation coefficient value; and program code for, in the event that said first activity graph and said second activity graph are determined to be correlated, generating an output indicative of said correlation.

32. A computer program product including a computer readable medium, said computer readable medium having a computer program stored thereon, said program for determining whether activity graphs for logical volumes of data storage are correlated, said program comprising:

program code for generating a first activity graph, said first activity graph including a series of activity level sample values associated with a first logical volume over a period of time;

program code for generating a second activity graph, said second activity graph including a series of activity level sample values associated with a second logical volume over said period of time;

program code for determining whether said first activity graph and said second activity graph are correlated, said determining based at least in part on at least two criteria selected from the criteria set consisting of:

an area ratio criteria, said area ratio criteria indicating that said first activity graph and said second activity graph are correlated in the event that an area ratio is at least as great as a predetermined value, wherein said area ratio comprises a ratio between a minimum area and a maximum area, wherein said minimum area is an area below both said first activity graph and said second activity graph, and wherein said maximum area is an area below at least one of the set consisting of said first activity graph and said second activity graph, a peak ratio criteria, said peak ratio criteria indicating that said first activity graph and said second activity graph are correlated in the event that a peak ratio is at least as large as a second predetermined value, wherein said peak ratio comprises a ratio between a number of coincidental peaks and the difference between a total number of peaks in both said activity graphs and said number of coincidental peaks, wherein said number of coincidental peaks is the number of peaks in said first activity graph which occur at the same time as respective peaks in said second activity graph, a sharp peak criteria, said sharp peak criteria indicating that said first activity graph and said second activity graph are correlated in the event that said first activity graph and said second activity graph have at least one pair of coincidental peaks, wherein each one of said coincidental peaks is a sharp peak, and wherein each said sharp peak includes a highest activity level of a respective one of said first and second activity graphs, wherein each said sharp peak is at least as great as a product of a next highest activity level in said respective one of said activity graphs and a predetermined multiplier, and wherein said sharp peak criteria further only indicates that said first activity graph and said second activity graph are correlated in the event that a correlation coefficient for said first activity graph and said second activity graph is greater than a predetermined correlation coefficient value, and a correlation coefficient criteria, said correlation coefficient criteria indicating that said first activity graph and said second activity graph are correlated in the event that a correlation coefficient for said first activity graph and said second activity graph is greater than a predetermined correlation coefficient value; and program code for, in the event that said first activity graph and said second activity graph are determined to be correlated, generating an output indicative of said correlation.

33. A computer data signal embodied in a carrier wave, said computer data signal including a computer program for determining whether activity graphs for logical volumes of data storage are correlated, said computer program comprising:

program code for generating a first activity graph, said first activity graph including a series of activity level sample values associated with a first logical volume over a period of time, wherein said first logical volume describes at least one storage area on said at least one storage disk;

program code for generating a second activity graph, said second activity graph including a series of activity level sample values associated with a second logical volume over said period of time, wherein said second logical volume describes at least one storage area on said at least one storage disk;

program code for determining whether said first activity graph and said second activity graph are correlated, said determining responsive, at least in part, to an area ratio criteria, said area ratio criteria indicating that said first activity graph and said second activity graph are correlated in the event that an area ratio is at least as great as a predetermined value, wherein said area ratio comprises a ratio between a minimum area and a maximum area, wherein said minimum area is an area below both said first activity graph and said second activity graph, and wherein said maximum area is an area below at least one of the set consisting of said first activity graph and said second activity graph; and program code for, in the event that said first activity graph and said second activity graph are determined to be correlated, generating an output indicative of said correlation.

34. A computer data signal embodied in a carrier wave, said computer data signal including a computer program for determining whether activity graphs for logical volumes of data storage are correlated, said computer program comprising:

program code for generating a first activity graph, said first activity graph including a series of activity level sample values associated with a first logical volume over a period of time, wherein said first logical volume describes at least one storage area on said at least one storage disk;

program code for generating a second activity graph, said second activity graph including a series of activity level sample values associated with a second logical volume over said period of time, wherein said second logical volume describes at least one storage area on said at least one storage disk;

program code for determining whether said first activity graph and said second activity graph are correlated, said determining responsive, at least in part, to a peak ratio criteria, said peak ratio criteria indicating that said first activity graph and said second activity graph are correlated in the event that a peak ratio is at least as large as a second predetermined value, wherein said peak ratio comprises a ratio between a number of coincidental peaks and the difference between a total number of peaks in both said activity graphs and said number of coincidental peaks, wherein said number of coincidental peaks is the number of peaks in said first activity graph which occur at the same time as respective peaks in said second activity graph; and program code for, in the event that said first activity graph and said second activity graph are determined to be correlated, generating an output indicative of said correlation.

35. The computer data signal of claim 34, wherein said program further comprises program code for determining an activity level sample value to be a peak in the event that said activity level sample value is at least as great as an average activity level for the respective activity graph.

36. The computer data signal of claim 34, wherein said program further comprises program code for determining an activity level sample value to be a peak in the event that said activity level sample value is at least as great as the sum of an average activity level for the respective activity graph and a predetermined offset value.

37. The computer data signal of claim 34, wherein said program further comprises program code for determining an activity level sample value to be a peak in the event that said activity level sample value is at least as great as the product of an average activity level for the respective activity graph and a predetermined multiplier value.

38. The computer data signal of claim 34, wherein said program further comprises program code for determining an activity level sample value to be a peak in the event that said activity level sample value is at least as great as the product of an average activity level for the respective activity graph and a predetermined multiplier value, plus a predetermined offset.

39. A computer data signal embodied in a carrier wave, said computer data signal including a computer program for determining whether activity graphs for logical volumes of data storage are correlated, said computer program comprising:

program code for generating a first activity graph, said first activity graph including a series of activity level sample values associated with a first logical volume over a period of time, wherein said first logical volume describes at least one storage area on said at least one storage disk;

program code for generating a second activity graph, said second activity graph including a series of activity level sample values associated with a second logical volume over said period of time, wherein said second logical volume describes at least one storage area on said at least one storage disk;

program code for determining whether said first activity graph and said second activity graph are correlated, said determining responsive, at least in part, to a sharp peak criteria, said sharp peak criteria indicating that said first activity graph and said second activity graph are correlated in the event that said first activity graph and said second activity graph have at least one pair of coincidental peaks, wherein each one of said coincidental peaks is a sharp peak, and wherein each said sharp peak includes a highest activity level of a respective one of said first and second activity graphs, wherein each said sharp peak is at least as great as a product of a next highest activity level in said respective one of said activity graphs and a predetermined multiplier, and wherein sharp peak criteria further only indicates that said first activity graph and said second activity graph are correlated in the event that a correlation coefficient for said first activity graph and said second activity graph is greater than a predetermined correlation coefficient value; and program code for, in the event that said first activity graph and said second activity graph are determined to be correlated, generating an output indicative of said correlation.

40. A computer data signal embodied in a carrier wave, said computer data signal including a computer program for determining whether activity graphs for logical volumes of data storage are correlated, said computer program comprising:

program code for generating a first activity graph, said first activity graph including a series of activity level sample values associated with a first logical volume over a period of time;

program code for generating a second activity graph, said second activity graph including a series of activity level sample values associated with a second logical volume over said period of time;

program code for determining whether said first activity graph and said second activity graph are correlated, said determining based at least in part on at least two criteria selected from the criteria set consisting of:

an area ratio criteria, said area ratio criteria indicating that said first activity graph and said second activity graph are correlated in the event that an area ratio is at least as great as a predetermined value, wherein said area ratio comprises a ratio between a minimum area and a maximum area, wherein said minimum area is an area below both said first activity graph and said second activity graph, and wherein said maximum area is an area below at least one of the set consisting of said first activity graph and said second activity graph, a peak ratio criteria, said peak ratio criteria indicating that said first activity graph and said second activity graph are correlated in the event that a peak ratio is at least as large as a second predetermined value, wherein said peak ratio comprises a ratio between a number of coincidental peaks and the difference between a total number of peaks in both said activity graphs and said number of coincidental peaks, wherein said number of coincidental peaks is the number of peaks in said first activity graph which occur at the same time as respective peaks in said second activity graph, a sharp peak criteria, said sharp peak criteria indicating that said first activity graph and said second activity graph are correlated in the event that said first activity graph and said second activity graph have at least one pair of coincidental peaks, wherein each one of said coincidental peaks is a sharp peak, and wherein each said sharp peak includes a highest activity level of a respective one of said first and second activity graphs, wherein each said sharp peak is at least as great as a product of a next highest activity level in said respective one of said activity graphs and a predetermined multiplier, and wherein said sharp peak criteria further only indicates that said first activity graph and said second activity graph are correlated in the event that a correlation coefficient for said first activity graph and said second activity graph is greater than a predetermined correlation coefficient value, and a correlation coefficient criteria, said correlation coefficient criteria indicating that said first activity graph and said second activity graph are correlated in the event that a correlation coefficient for said first activity graph and said second activity graph is greater than a predetermined correlation coefficient value; and program code for, in the event that said first activity graph and said second activity graph are determined to be correlated, generating an output indicative of said correlation.

* * * * *